United States Patent
Barbee

[19]

[11] Patent Number: 6,074,758
[45] Date of Patent: Jun. 13, 2000

[54] POLY(HYDROXY ESTER ETHERS) AS BARRIER RESINS

[75] Inventor: Robert Boyd Barbee, Kingsport, Tenn.

[73] Assignee: Eastman Chemical Company, Kingsport, Tenn.

[21] Appl. No.: 09/433,844

[22] Filed: Nov. 4, 1999

[51] Int. Cl.[7] .............................. B32B 27/06; C08G 63/16; C08G 63/78
[52] U.S. Cl. .......................... 428/480; 528/288; 528/292; 528/295; 528/297; 528/298; 528/302; 528/305; 528/306; 528/307; 528/308; 528/308.6; 525/437; 525/444
[58] Field of Search ...................... 528/288, 292, 528/297, 298, 302, 295, 305, 306, 307, 308, 308.6; 525/437, 444; 428/480

[56] References Cited

U.S. PATENT DOCUMENTS

| | | |
|---|---|---|
| 4,436,895 | 3/1984 | Barbee et al. . |
| 4,536,526 | 8/1985 | Murase ..................................... 523/433 |
| 5,134,201 | 7/1992 | Billovits et al. . |
| 5,686,551 | 11/1997 | White et al. ............................. 528/101 |
| 5,780,582 | 7/1998 | Wang et al. . |

FOREIGN PATENT DOCUMENTS

| | | |
|---|---|---|
| 0 542 972 B1 | 5/1993 | European Pat. Off. . |
| WO 92/21707 | 12/1992 | WIPO . |

*Primary Examiner*—Samuel A. Acquah
*Attorney, Agent, or Firm*—Matthew W. Smith; Harry J. Gwinnell

[57] ABSTRACT

A poly(hydroxy ester ether) is prepared by reacting a) a diacid containing a hetero moiety of the formula:

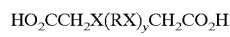

$$HO_2CCH_2X(RX)_yCH_2CO_2H$$

wherein X is selected from the group consisting of —O—, —S—, and NH; y is the whole number 0 or 1; and R is selected from the group consisting of an aromatic moiety and a heterocyclic moiety having from 6 to 30 carbon atoms; and b) a diglycidyl ether generally represented by the formula:

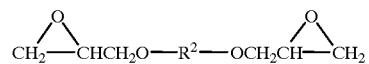

wherein $R^2$ is an aromatic moiety or divalent aliphatic hydrocarbon having 2 to 20 carbon atoms. Films, articles and laminations made from the composition exhibit an oxygen permeability of less than about 8 cc-mil/100 in$^2$-24 hour-atmosphere. The present invention is further directed to a miscible blend having the poly(hydroxy ester ether) of the present invention and a second component selected from a saturated polyester of an aromatic diacid, such as PET and PEN.

31 Claims, No Drawings

POLY(HYDROXY ESTER ETHERS) AS BARRIER RESINS

BACKGROUND OF THE INVENTION

1. Field of the Invention

The present invention relates to a poly(hydroxy ester ether) thermoplastic composition having barrier properties and to articles made from such polyesters and blends of such polyesters.

2. Background of the Invention

Because of their transparency, low permeability to oxygen, carbon dioxide, and water vapor, as well as low permeability to various products indigenous to foods, thermoplastic polyesters such as poly(ethylene terephthalate) (PET) and poly(ethylene naphthalate) (PEN) are used commercially in the packaging of various materials such as seasonings, carbonated beverages, detergents, cosmetics, and the like. While PET exhibits adequate barrier properties for packaging some materials, its oxygen barrier properties are inadequate for the packaging of more oxygen sensitive foodstuffs and beverages such as beer, wine, or low acid foods such as meats or vegetables.

Presently there is a strong interest in the packaging industry for protecting such oxygen sensitive foodstuffs in moldable thermoplastic materials where such materials have an oxygen transmission rate of less than about 15 $cm^3$-mil/100 $in^2$-24 hr-atm at 76% relative humidity.

U.S. Pat. No. 5,134,201 discloses a thermoplastic polymeric composition composed of a blend of: a) a linear, saturated polyester of aromatic diacids, such as PET; and b) a thermoplastic methylolpolyester which is miscible with component (a) and which has repeating units of:

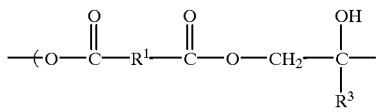

wherein each of $R_1$ and $R_2$ is individually a divalent organic moiety which is predominantly hydrocarbon, each $R_3$ is individually hydrogen or lower alkyl, y is about 0.5, and x is a fraction from about 0.05 to about 0.4.

U.S. Pat. No. 5,780,582 discloses a hydroxy functional polyester oligomers that are useful as hot melt adhesives. The poly(hydroxy ester) and poly(hydroxy ester ether) oligomers are derived from hydroxy-functional aliphatic diacids and diglycidyl ethers.

U.S. Pat. No. 4,436,895 discloses a polyester resin composed of the reaction product of a diol containing up to about 8 carbon atoms and a diacid component which includes terephthalic acid and a second diacid selected from iminodiacetic acid, oxydiacetic acid, thiodiacetic acid, and mixtures thereof The second diacid is present in a concentration of about 1 to 50 mole percent, based upon the total amount of diacid. The polyester resin has an inherent viscosity of about 0.5 to 1.5. A preferred polyester is derived from ethylene glycol, terephthalic acid, and oxydiacetic acid. The containers are formed from the polyester have improved resistance to gas permeability.

European patent specification EP 0 542 972 and discloses a thermoplastic barrier polymer having aromatic ether moieties and amide moieties in the backbone chain and pendant hydroxyl moieties that is prepared by reacting one or more amide-containing bisphenols and an epihalohydrin.

While molded containers formed from polyethylene terephthalate have many desirable characteristics, there is a need in the art to provide improved polyester containers which will have a gas permeability, and specifically an oxygen permeability, which is lower than those of containers formed from the aforementioned polyesters and blends of polyesters. Containers from such improved materials would be much more versatile in their utilization and allow the containers to be used to package substances for which the polyethylene terephthalate containers may not be suitable.

In view of the limitations of the prior art, it would be desirable to provide a composition having improved barrier properties. It would further be desirable to provide a composition with improved compatibility which may be blended with polyesters, such as PET, and poly(hydroxy ester ethers) to provide compositions with improved barrier properties and not be subject to limitations found in immiscible blends.

It has now been found that containers which are formed from the specified composition of the present invention exhibit desirable physical properties, including improved gas barrier properties, which render them advantageous for use in packaging of oxygen sensitive foodstuffs.

SUMMARY OF THE INVENTION

One aspect of the present invention is for a thermoplastic polymeric composition having improved resistance to gas permeability, and particularly oxygen permeability, comprising the reaction product of: a) a diacid containing a hetero moiety of the formula:

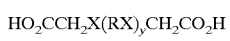

wherein X is selected from —O—, —S—, or NH; y is the whole number 0 or 1; and R is selected from an aromatic moiety or a hetero-cyclic moiety having from 6 to 30 carbon atoms; and b) a diglycidyl ether generally represented by the formula:

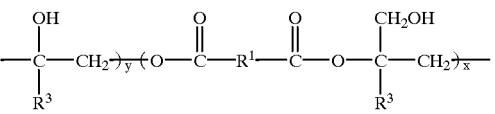

wherein $R^2$ is an aromatic moiety or divalent aliphatic hydrocarbon having 2 to 20 carbon atoms and may further contain a hetero-atomic group.

Another aspect of the present invention is a miscible blend of components: a) the composition of the present invention and b) a second component selected from a linear, saturated polyester of aromatic diacids.

In forming a blend, unless the refractive indices of the blend components are very close (i.e., refractive index difference between blend components <0.005), blends of polymers are usually opaque because of multiple internal refraction as light passes through their distributed phase morphology. It was surprisingly discovered that the present composition has utility in forming miscible blends with a linear, saturated polyester of aromatic diacids. It was further surprisingly discovered that such blends have enhanced oxygen barrier properties relative to a polyester of aromatic diacids without the composition of the present invention.

Advantageously, the thermoplastic polymeric composition of the present invention can be used to form sheets, films and molded articles having improved barrier properties.

DETAILED DESCRIPTION OF THE INVENTION

The composition of the present invention comprises the reaction product of a diacid containing a hetero moiety and a diglycidyl ether. The diacid moiety has the general formula:

wherein X is selected from —O—, —S—, or NH; y is the whole number 0 or 1; and R is selected from an aromatic moiety or a hetero-cyclic moiety having from 6 to 30 carbon atoms, and desirably from 6 to 24 carbon atoms. The aromatic moieties may have one or more non-carbon atoms in the ring such as, for example, sulfur, nitrogen and oxygen, or one or more substituent groups selected from alkyl, cycloalkyl, aryl, alkoxy, aryloxy, amido, halo, nitro, or cyano groups, carboxyl, carbonyl or sulfoxyl, bonded to the aromatic ring. These substituent groups may be in the chain or substituent thereto.

Desirably, R is selected from the group consisting of:

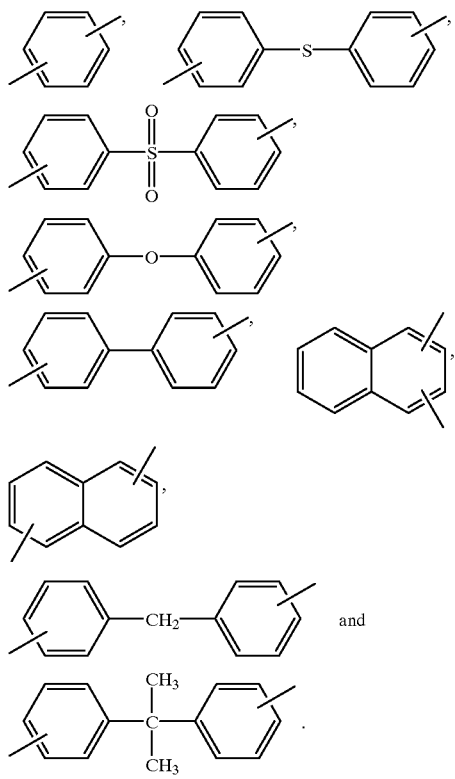

In a more preferred embodiment, R is a phenylene moiety, X is oxygen, and y is 1.

In a preferred embodiment, the diacid is selected from iminodiacetic acid (N-(carboxymethyl)-glycine); oxydiacetic acid (diglycolic acid; 2,2'-oxybisacetic acid); thiodiacetic acid (2,2'-thiobisacetic acid); 1,4-phenylenedioxy diacetic acid; 1,3-phenylenedioxy diacetic acid; and mixtures thereof. Especially preferred diacids are selected from 1,3-phenylenedioxydiacetic acid; 1,4 phenylenedioxydiacetic acid; oxydiacetic acid and mixtures thereof.

The diacid can further include a second dicarboxylic acid component selected from 2,6-naphthalenedicarboxylic acid, phthalic acid; isophthalic acid; terephthalic acid; cyclohexanedicarboxylic acid; diphenyl-4,4-dicarboxylic acid; succinic acid; glutaric acid; adipic acid; fumaric acid; azelaic acid; sebacic acid; 2,7-naphthalenedicarboxylic acid; 1,4-cyclohexanedicarboxylic acid; diglycolic acid; 4,4-oxybis (benzoic) acid; biphenyldicarboxylic acid; 1,12-dodecanedicarboxylic acid; 4,4-sulfonyldibenzoic acid; 4,4-methylenedibenzoic acid; trans-4,4-stilbenedicarboxylic acid; esters of the aforementioned acids and combinations thereof. Preferably, the diacid includes a dicarboxylic acid selected from isophthalic acid, adipic acid and mixtures thereof.

The diacid includes from about 5 mole % to about 100 mole % of the heteroatom-containing dicarboxylic and about 95 mole % to 0 mole % of the second dicarboxylic acid component, preferably from about 5 mole % to about 90 mole % of the heteroatom-containing dicarboxylic and about 95 mole % to 10 mole % of the second dicarboxylic acid component, and more preferably from about 10 mole % to about 90 mole % of the heteroatom-containing dicarboxylic and about 90 mole % to 10 mole % of the second dicarboxylic acid component.

The diglycidyl ether component of the present invention is generally represented by the formula:

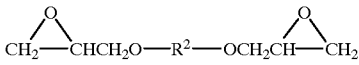

wherein $R^2$ is an aromatic moiety or divalent aliphatic hydrocarbon having 2 to 20 carbon atoms and may further contain a heteroatomic group. In a preferred embodiment, $R^2$ is m-phenylene, p-phenylene or 2,6-napthalene; diphenylene-isopropylidene, sulfonyldiphenylene, carbonyldiphenylene, 1,4-cyclohexylenedimethylene oxydiphenylene, and mixtures thereof.

The poly(hydroxy ester ethers) of the present invention can be prepared by reacting dicarboxylic acids and diglycidyl ethers at conditions sufficient to provide polyester bonds. The conditions at which the polymerization reaction is most advantageously conducted are dependent on a variety of factors, including the specific reactants, solvent, and catalyst employed, if any. In general, the reaction is conducted under a non-oxidizing atmosphere such as a blanket of nitrogen or other inert gases. The reaction can be conducted with or without solvents or other diluents. However, in order to ensure homogeneous reaction mixtures and to moderate exothermic reactions at such temperatures, it is often desirable to use inert organic solvents.

Any inert organic solvent which can dissolve the monomers to the appropriate degree and can be heated to the appropriate polymerization temperature either at atmospheric, subatmospheric or superatmospheric pressure could be used. Examples of suitable solvents include pyridine, triethylamine, N-methylpyrrolidinone (NMP), methyl benzoate, ethyl benzoate, butyl benzoate; cyclopentanone, cyclohexanone, cycloheptanone, cyclooctanone, cyclohexylpyrrolidinone; and ethers or hydroxy ethers such as diglyme, triglyme, diethylene glycol ethyl ether, diethylene glycol methyl ether, dipropylene glycol methyl ether, dipropylene glycol dimethyl ether, propylene glycol phenyl ether, propylene glycol methyl ether and tripropylene glycol methyl ether; toluene, mesitylene, xylene, benzene, dipropylene glycol monomethyl ether acetate, halogenated solvents such as dichlorobenzene, propylene carbonate, naphthalene, diphenyl ether, butyrolactone, dimethylacetamide, dimethylformamide and mixtures thereof. The preferred solvents are dioxane and mixtures of xylene and cyclohexanone.

The time and temperature most advantageously employed will vary depending on the specific monomers employed, particularly their reactivity, and the organic liquid, if any, used. Typically, the reaction temperature to form the composition of the present invention is from about 40° C. to about 240° C. and, most preferably, from about 60° C. to about 160° C. The reaction time can be from about 5 minutes to about 24 hours, more preferably from about 15 minutes to about 8 hours and, most preferably, from about 30 minutes to about 4 hours.

Examples of preferred catalysts include tetrahydrocarbyl quaternary ammonium halides wherein hydroxycarbyl is monovalent hydrocarbon radical such as alkyl, aryl, cycloalkyl, aralkyl, and alkaryl, preferably having from 1 to 16 carbon atoms. Examples of preferred catalysts include tetralkyl quaternary ammonium halides, with tetrabutyl ammonium chloride being the most preferred. Other suitable catalysts include tetrahydrocarbyl phosphonium halides such as ethyltriphenylphosphonium iodide and tetraphenylphosphonium bromide.

The concentrations at which the reactants are most advantageously employed in the liquid reaction medium are dependent on a variety of factors including the specific monomers and organic liquid employed and the polymer being prepared. In general, the monomers are employed in an acid to epoxy stoichiometric ratio of from about 0.5:1 to about 2:1 preferably at a 0.8:1 to 1.2:1 ratio. If desired, oligomers prepared with an excess of bis-epoxide may be further reacted with monofunctional carboxylic acids. Optionally, the bis-epoxide can be concurrently reacted with a combination of mono and di-functional carboxylic acids.

One skilled in the art will further understand that suitable additives, such as dyes, pigments, plasticizers, fillers, antioxidants, stabilizers, etc., may optionally be employed in conventional amounts. Such additives may be added directly to the reaction or may be added to the final polymer.

The poly(hydroxy ester ethers) of the present invention may be formed into containers by conventional plastic processing techniques. For example, sheets, films, and other like structures can be formed by well-known extrusion techniques.

Another aspect of the present invention is a miscible blend composed of: a) the composition of the present invention and b) a second component selected from a linear, saturated polyester of aromatic diacids. Preferred saturated polyesters include PET, PEN and copolymers thereof. Such blends can have from about 2 weight % to about 98 weight % of component (a) and from about 98 weight % to about 2 weight % of the saturated polyester, preferably the blend contains from about 5 weight % to about 90 weight % of component (a) and from about 95 weight % to about 10 weight % of the linear polyester, wherein the weight % is based on the total weight of components (a) and (b).

The blends of the present invention can be prepared using processes known to those skilled in the art. For example, the components may be in solid form and dry-blending using conventional means such as a barrel mixer, a tumble mixer, and the like, followed by fluxing or melting in an appropriate apparatus, such as a Banbury type internal mixer, rubber mill, single or twin screw extruder or a compounding apparatus, or the like. Preferably, the two components are brought together and processed in an appropriate melt extruder, from which the blend is extruded in the form of strands which are pelletized for fabrication purposes.

Advantageously, containers may be formed by coextruding (e.g., in the form of a "pipe" or otherwise) a layer of the composition of the present invention together with resins which are suitable for forming laminates or coextruded articles. Suitable resins include polyethylene terephthalate, poly(1,4-cyclohexylenedimethylene terephthalate), and other such well known polyesters.

Film or sheet materials made from the composition and blends of the present invention are strong, flexible, and clear and may be also be formed into articles such as wrappers, bags, and the like. Films and articles made from the poly (hydroxy ester ether) composition of the present invention desirably have an oxygen permeability of less than about 8 cc-mil/100 in$^2$-24 hour-atmosphere, preferably less than about 5 cc-mil/100 in$^2$-24 hour-atmosphere, and more preferably are less than about 2 cc-mil/ 100 in$^2$-24 hour-atmosphere.

Another aspect of the present invention is for a laminated structure having a plurality of layers and at least one of the layers is the composition and blends of the present invention. The composition and/or thermoplastic blends thereof may be used either as an individual layer or as a tie layer between two or more layers to provide improved oxygen barrier properties relative to a structure without such a barrier layer. Examples of such structures include beverage containers and foodstuff packages. The layers of the laminated structure can be arranged so that each layer of the laminated structure is composed of a material different from at least one of the preceding layers.

The invention is now described with reference to the following examples which are for purposes of illustration only and are not intended to imply any limitation on the scope of the invention.

In the following examples, oxygen permeability was measured as cubic centimeters permeating a 1 mil (0.001 inch) thick sample, 100 square inches, for a 24 hour period under an oxygen partial pressure difference of 1 atmosphere, a temperature of 30° C., and a relative humidity of about 68% (as described in the standard test procedure ASTM D-3985 (1995)). Oxygen permeability was determined using a MOCON Oxtran 1000 instrument, available from Modern Controls, Minneapolis, Minn.

The glass transition temperature (Tg) is determined by differential scanning calorimetry (DSC) on the second heating cycle scanning at 20° C./minute after the sample has been heated to melt and quenched to below the resin Tg. Tg values are reported as midpoint.

The number average molecular weight for the product was determined using gel permeation chromatography in 95/5 methylene chloride/hexafluoroisopropanol using a UV detector.

COMPARATIVE EXAMPLE 1

A 300 ml round bottom reaction vessel equipped with a stirrer, condenser, nitrogen inlet and thermocouple was charged with 24.5 grams of isophthalic acid (0.147 moles), 50.0 grams of diglycidyl ether of bisphenol A (0.147 moles), and 12 grams of tetrabutylammonium bromide. The flask was purged with nitrogen for 5 minutes. To this mixture, 150 mL dioxane was added and the mixture was heated and stirred at reflux and for 3.5 hours. After 3.5 hours, 3 mL of glacial acetic acid was added. The mixture was stirred at reflux for an additional hour then cooled to 25° C. The solution was poured into 2 liters of ice chilled water that was being stirred in an appropriately sized Waring Blender. The resulting white precipitate was washed twice using ice chilled water. The white solid was collected using filtration and dried overnight at a temperature of 70° C. and under vacuum. The product had a Tg of 90° C. as measured by DSC and a number average molecular weight of 10,500 as determined using gel permeation chromatography.

A film of poly(hydroxy ester ether) was prepared by pressing the sample between layers of polyimide film at 180° C. The permeability of the poly(hydroxy ester ether) was then determined by correcting for the permeability of the polyimide film and converting to a one mil basis using conventional calculations. The oxygen permeability rate was determined to be 3.49 cc-mil/100 in$^2$-24 hour-atmosphere.

COMPARATIVE EXAMPLE 2

A 300 ml round bottom reaction vessel equipped with a stirrer, condenser, nitrogen inlet and thermocouple was charged with 12.7 grams of adipic acid (0.0869 moles), 29.5 grams of diglycidyl ether of bisphenol A (0.0869 moles), and 6.7 grams of tetrabutylamnmonium bromide. The flask was purged with nitrogen for 5 minutes. To this mixture, 150 mL of dioxane was added and the mixture was heated and stirred at reflux for 3.5 hours. After 3.5 hours, 1.7 mL of glacial acetic acid was added. The mixture was stirred at reflux for an additional hour then cooled to 25° C. The solution was poured into 2 liters of ice chilled water that was being stirred in a Waring Blender. The resulting white precipitate was washed twice in ice chilled water. The white solid collected using filtration and dried overnight at a temperature of 30° C. and under vacuum. The product had a Tg of 39° C. as measured by DSC and a number average molecular weight of 6500 as determined using gel permeation chromatography.

A film of poly(hydroxy ester ether) was prepared using the technique discussed above in Comparative Example 1. The oxygen permeability rate was determined to be 9.2 cc-mil/100 in$^2$-24 hour-atmosphere.

Examples 1 and 2 below illustrate the improved gas barrier properties for containers formed from the composition of the present invention, that is, a poly(hydroxy ester ether) formed from the reaction product of a diacid moiety having a hetero atom and a diglycidyl ether.

EXAMPLE 1

The procedure of Comparative Example 1 was repeated except for the following conditions:
29.2 grams of 1,3-phenylenedioxy diacetic acid (0.129 moles), 44.1 grams of diglycidyl ether of bisphenol A (0.129 moles), and 10.4 grams of tetrabutylammonium bromide were reacted together, and 2.6 mL of glacial acetic acid was added to the mixture at the as specified time.

The product had a Tg of 62° C. as measured by DSC and a number average molecular weight of 13,000 as determined using gel permeation chromatography.

A film of poly(hydroxy ester ether) was prepared using the technique discussed above in Comparative Example 1. The oxygen permeability rate was determined to be 1.13 cc-mil/100 in$^2$-24 hour-atmosphere.

EXAMPLE 2

The procedure of Comparative Example 1 was repeated except for the following conditions:
19.7 grams of oxydiacetic acid (0.147 moles) was used in place of the 24.5 grams of isophthalic acid.
The product had a Tg of 58° C. as measured by DSC and a number average molecular weight of 5,200 as determined using gel permeation chromatography.

A film of poly(hydroxy ester ether) was prepared using the technique discussed above in Comparative Example 1. The oxygen permeability rate was determined to be 1.11 cc-mil/100 in$^2$-24 hour-atmosphere.

Having described the invention in detail, those skilled in the art will appreciate that modifications may be made to the various aspects of the invention without departing from the scope and spirit disclosed and described herein. It is, therefore, not intended that the scope of the invention be limited to the specific embodiments illustrated and described but rather it is intended that the scope of the present invention be determined by the appended claims and their equivalents.

We claim:

1. A thermoplastic polymeric composition comprising the reaction product of:

a) a diacid containing a hetero moiety of the formula:

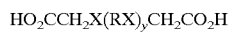

$$HO_2CCH_2X(RX)_yCH_2CO_2H$$

wherein X is selected from the group consisting of —O—, —S—, and NH; y is the whole number 0 or 1; and R is selected from the group consisting of an aromatic moiety and a heterocyclic moiety having from 6 to 30 carbon atoms; and b) a diglycidyl ether generally represented by the formula:

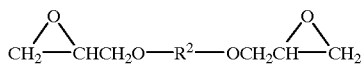

wherein R$^2$ is an aromatic moiety or divalent aliphatic hydrocarbon having 2 to 20 carbon atoms.

2. The composition of claim 1 wherein R is selected from the group consisting of aromatic moiety and a heterocyclic moiety having from 6 to 24 carbon atoms.

3. The composition of claim 1 wherein R is selected from the group consisting of

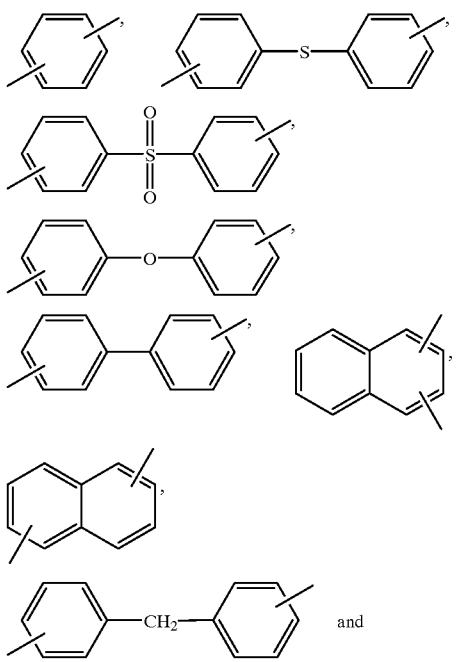

and

-continued

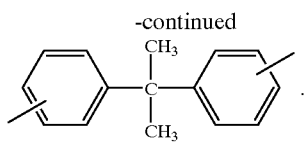

4. The composition of claim 2 wherein said aromatic moiety includes a non-carbon atom selected from the group consisting of sulfur, nitrogen and oxygen in the ring.

5. The composition of claim 3 wherein said aromatic moiety includes a substituent group selected from the group consisting of alkyl, cycloalkyl, aryl, alkoxy, aryloxy, amido, halo, nitro, or cyano groups, carboxyl, carbonyl and sulfoxyl bonded to the aromatic ring.

6. The composition of claim 1 wherein R is a phenylene moiety, X is oxygen, and y is 1.

7. The composition of claim 1 wherein said diacid is selected from the group consisting of iminodiacetic acid (N-(carboxymethyl)-glycine); oxydiacetic acid (diglycolic acid; 2,2'-oxybisacetic acid); thiodiacetic acid (2,2'-thiobisacetic acid); 1,4-phenylenedioxy diacetic acid; 1,3-phenylenedioxy diacetic acid; and mixtures thereof.

8. The composition of claim 1 wherein said diacid is selected from the group consisting of 1,3-phenylenedioxydiacetic acid; 1,4 phenylenedioxydiacetic acid; oxydiacetic acid, and mixtures thereof.

9. The composition of claim 7 further comprising a second dicarboxylic acid component selected from the group consisting of 2,6-naphthalenedicarboxylic acid, phthalic acid; isophthalic acid; terephthalic acid; cyclohexanedicarboxylic acid; diphenyl-4,4-dicarboxylic acid; succinic acid; glutaric acid; adipic acid; fumaric acid; azelaic acid; sebacic acid; 2,7-naphthalenedicarboxylic acid; 1,4-cyclohexanedicarboxylic acid; diglycolic acid; 4,4-oxybis(benzoic) acid; biphenyldicarboxylic acid; 1,12-dodecanedicarboxylic acid; 4,4-sulfonyldibenzoic acid; 4,4-methylenedibenzoic acid; trans-4,4-stilbenedicarboxylic acid; esters of the aforementioned acids and combinations thereof.

10. The composition of claim 9 wherein said second dicarboxylic acid component is selected from the group consisting of isophthalic acid, adipic acid and mixtures thereof.

11. The composition of claim 9 wherein said diacid includes from about 5 mole % to about 100 mole % of said heteroatom-containing dicarboxylic diacid and about 95 mole % to 0 mole % of said second dicarboxylic acid component.

12. The composition of claim 9 wherein said diacid includes from about 5 mole % to about 90 mole % of said heteroatom-containing dicarboxylic diacid and about 95 mole % to 10 mole % of said second dicarboxylic acid component.

13. The composition of claim 9 wherein said diacid includes from about 10 mole % to about 90 mole % of said heteroatom-containing dicarboxylic diacid and about 90 mole % to 10 mole % of said second dicarboxylic acid component.

14. The composition of claim 1 wherein $R^2$ is selected from the group consisting of m-phenylene, p-phenylene or 2,6-napthalene; diphenylene-isopropylidene, sulfonyldiphenylene, carbonyldiphenylene, 1,4-cyclohexylenedimethylene oxydiphenylene, and mixtures thereof.

15. A poly(hydroxy ester ether) comprising the reaction product of:

a) a diacid containing a hetero moiety of the formula:

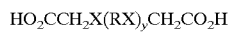

wherein X is selected from the group consisting of —O—, —S—, and NH; y is the whole number 0 or 1; and R is an aromatic moiety having from 6 to 24 carbon atoms; and b) a diglycidyl ether generally represented by the formula:

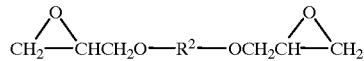

wherein $R^2$ is an aromatic moiety or divalent aliphatic hydrocarbon having 2 to 20 carbon atoms.

16. The poly(hydroxy ester ether) of claim 1 wherein R is selected from the group consisting of

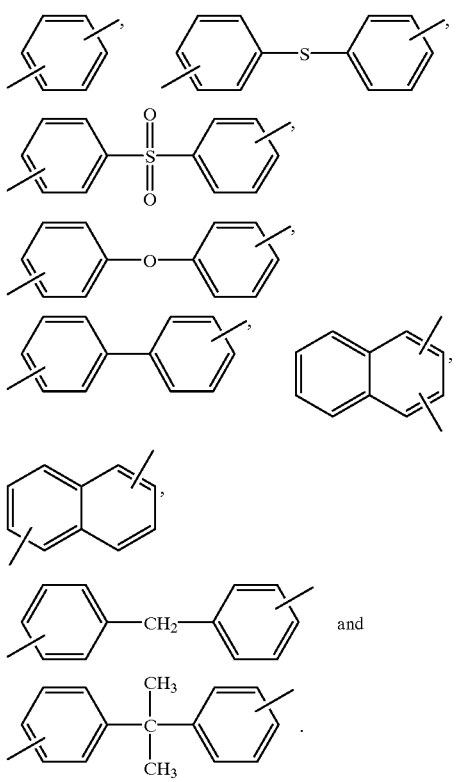

17. The poly(hydroxy ester ether) of claim 16 wherein said aromatic moiety includes a substituent group selected from the group consisting of alkyl, cycloalkyl, aryl, alkoxy, aryloxy, amido, halo, nitro, or cyano groups, carboxyl, carbonyl and sulfoxyl bonded to the aromatic ring.

18. The poly(hydroxy ester ether) of claim 15 wherein said diacid is selected from the group consisting of iminodiacetic acid (N-(carboxymethyl)-glycine); oxydiacetic acid (diglycolic acid; 2,2'-oxybisacetic acid); thiodiacetic acid (2,2'-thiobisacetic acid); 1,4-phenylenedioxy diacetic acid; 1,3-phenylenedioxy diacetic acid; and mixtures thereof.

19. The poly(hydroxy ester ether) of claim 18 farther comprising a second dicarboxylic acid component selected from the group consisting of 2,6-naphthalenedicarboxylic acid, phthalic acid; isophthalic acid; terephthalic acid; cyclohexanedicarboxylic acid; diphenyl-4,4-dicarboxylic acid; succinic acid; glutaric acid; adipic acid; fumaric acid; azelaic acid; sebacic acid; 2,7-naphthalenedicarboxylic acid; 1,4-cyclohexanedicarboxylic acid; diglycolic acid; 4,4- oxybis(benzoic) acid; biphenyldicarboxylic acid; 1,12-dodecanedicarboxylic acid; 4,4-sulfonyldibenzoic acid; 4,4-methylenedibenzoic acid; trans-4,4-stilbenedicarboxylic acid; esters of the aforementioned acids and combinations thereof, and wherein said diacid includes from about 5 mole % to about 100 mole % of said heteroatom-containing dicarboxylic and about 95 mole % to 0 mole % of said second dicarboxylic acid component.

20. The poly(hydroxy ester ether) of claim 15 wherein $R^2$ is selected from the group consisting of m-phenylene, p-phenylene or 2,6-napthalene; diphenylene-isopropylidene, sulfonyldiphenylene, carbonyldiphenylene, 1,4-cyclohexylenedimethylene oxydiphenylene, and mixtures thereof.

21. The poly(hydroxy ester ether) of claim 15 wherein a one mil film of said composition has an oxygen permeability of less than about 8 cc-mil/100 in$^2$-24 hour-atmosphere.

22. The poly(hydroxy ester ether) of claim 15 wherein a one mil film of said composition has an oxygen permeability of less than about 5 cc-mil/100 in$^2$-24 hour-atmosphere.

23. The poly(hydroxy ester ether) of claim 15 wherein a one mil film of said composition has an oxygen permeability of less than about 2 cc-mil/100 in$^2$-24 hour-atmosphere.

24. A miscible blend comprising of:
a) A poly(hydroxy ester ether) comprising the reaction product of:
i) a diacid containing a hetero moiety of the formula:

HO$_2$CCH$_2$X(RX)$_y$CH$_2$CO$_2$H wherein X is selected from the group consisting of —O—, —S—, and NH; y is the whole number 0 or 1; and R is an aromatic moiety having from 6 to 24 carbon atoms; and
ii) a diglycidyl ether generally represented by the formula:

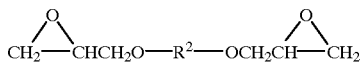

CH$_2$—CHCH$_2$O—R$^2$—OCH$_2$CH—CH$_2$ wherein $R^2$ is an aromatic moiety or divalent aliphatic hydrocarbon having 2 to 20 carbon atoms; and
b) a second component selected from a linear, saturated polyester of aromatic diacids.

25. The blend of claim 24 wherein said saturated polyester is selected from the group consisting of PET, PEN and copolymers thereof.

26. The blend of claim 24 wherein said blend includes from about 2 weight % to about 98 weight % of component (a) and from about 98 weight % to about 2 weight % of component (b), wherein the weight % is based on the total weight of components (a) and (b).

27. The blend of claim 24 wherein said blend includes from about 5 weight % to about 90 weight % of component (a) and from about 95 weight % to about 10 weight % of component (b), wherein the weight % is based on the total weight of components (a) and (b).

28. A laminated structure comprising:
a. a first layer comprising a thermoplastic material selected from the group consisting of PET, PEN and mixtures thereof; and
b. a second layer adjacent to said first layer and comprising a thermoplastic polymeric composition comprising the reaction product of:
i) a diacid containing a hetero moiety of the formula:

HO$_2$CCH$_2$X(RX)$_y$CH$_2$CO$_2$H wherein X is selected from the group consisting of —O—, —S—, and NH; y is the whole number 0 or 1; and R is selected from the group consisting of an aromatic moiety and a heterocyclic moiety having from 6 to 30 carbon atoms; and
ii) a diglycidyl ether generally represented by the formula:

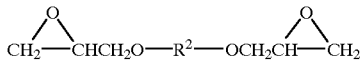

CH$_2$—CHCH$_2$O—R$^2$—OCH$_2$CH—CH$_2$ wherein $R^2$ is an aromatic moiety or divalent aliphatic hydrocarbon having 2 to 20 carbon atoms.

29. The laminated structure of claim 28 further comprising a third layer of a thermoplastic material different from at least one of said first or second layers.

30. The laminated structure of claim 28 wherein R is a phenylene moiety, X is oxygen, and y is 1.

31. The laminated structure of claim 28 wherein a one mil film of said composition has an oxygen permeability of less than about 2 cc-mil/100 in$^2$-24 hour-atmosphere.

* * * * *